US006337136B1

(12) United States Patent
Suzuki et al.

(10) Patent No.: US 6,337,136 B1
(45) Date of Patent: Jan. 8, 2002

(54) ALUMINUM ALLOY SUPPORT FOR LITHOGRAPHIC PRINTING PLATE AND PROCESS FOR PRODUCING SUBSTRATE FOR SUPPORT

(75) Inventors: Hideki Suzuki; Ichiro Okamoto, both of Ihara-gun; Kazumitsu Mizushima, Inazawa; Tadashi Asahi, Tokyo; Hirokazu Sawada; Hirokazu Sakaki, both of Haibara-gun, all of (JP)

(73) Assignees: Nippon Light Metal Company, Ltd., Toyko; Fuji Photo Film Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/363,127

(22) Filed: Jul. 28, 1999

(30) Foreign Application Priority Data

Jul. 30, 1998 (JP) .......................................... 10-216078
Jun. 1, 1999 (JP) .......................................... 11-154096

(51) Int. Cl.$^{7}$ ......................... B32B 15/01; B32B 15/02; B41N 1/04

(52) U.S. Cl. .................... 428/472; 428/472.2; 101/459; 420/534; 420/537; 420/546; 420/549

(58) Field of Search ............................. 428/472.2, 472; 101/459; 420/529, 533, 534, 537, 538, 544, 549

(56) References Cited

U.S. PATENT DOCUMENTS 5,562,784 A * 10/1996 Nishikawa et al. ......... 148/549

FOREIGN PATENT DOCUMENTS

| | | |
|---|---|---|
| JP | 6-192779 | 7/1994 |
| JP | 10-306355 | 11/1998 |

* cited by examiner

*Primary Examiner*—Deborah Jones
*Assistant Examiner*—Jennifer McNeil
(74) *Attorney, Agent, or Firm*—Merchant & Gould P.C.

(57) ABSTRACT

The present invention provides a support for a lithographic printing plate prepared by cold rolling a sheet while intermediate annealing is omitted to save energy and the number of the cold rolling steps are decreased to simplify the sheet production steps and to give a desired strength of the sheet, and by inhibiting precipitation of Si particles in the substrate to give extremely excellent resistance to ink staining in the nonimage areas during printing, and a process for producing a substrate therefore. The production process comprises homogenization heat-treating an aluminum alloy slab comprising 0.10 to 0.40 wt % of Fe, 0.03 to 0.15 wt % of Si, 0.004 to 0.03 wt % of Cu, and the balance of Al and unavoidable impurities, hot rolling the heat-treated slab, and cold-rolling the hot-rolled strip without intermediate annealing, the cold rolling including a final pass after which the sheet temperature becomes at least the recovery temperature of the sheet and the following rapid cooling, whereby an aluminum alloy substrate for a lithographic printing plate having a content of precipitated Si of up to 30 ppm and a tensile strength of from 145 to 180 MPa is produced. When the aluminum alloy is electrolytically grained and anodically oxidized, the resultant anodic oxide film can contain up to 200/mm$^2$ of precipitated Si particles having an average particle size of at least 0.5 $\mu$m.

2 Claims, No Drawings

ALUMINUM ALLOY SUPPORT FOR LITHOGRAPHIC PRINTING PLATE AND PROCESS FOR PRODUCING SUBSTRATE FOR SUPPORT

BACKGROUND OF THE INVENTION

1. Field of the Invention

The present invention relates to an aluminum alloy support for a lithographic printing plate, prepared by cold rolling while intermediate annealing is omitted and the number of the passes is decreased to simplify the sheet production steps, being extremely excellent in resistance to ink staining in the nonimage areas during printing and having proper strength, and a process for producing a substrate therefore.

2. Description of the Related Art

Conventional aluminum alloy substrates for a support for a lithographic printing plate are generally provided in the form of a 0.1 to 0.5 mm thick sheet made of an aluminum alloy such as JIS A1050. Such aluminum alloy sheets are generally produced by scalping the surface of a semicontinuous-cast slab, homogenization heat-treating the slab, hot-rolling the heat-treated slab, cold-rolling the hot-rolled strip, and further intermediate-annealing and finally cold-rolling to impart a desired strength to the sheet.

The aluminum alloy substrate for a lithographic printing plate thus produced is grained by either one of or a combination of at least two of the following steps: a mechanical step, a chemical step and an electrochemical step. Furthermore, in order to impart wear resistance, water retainability, resistance to staining in nonimage areas and adhesion of a photosensitive layer during printing, the grained aluminum alloy substrate is further anodically oxidized (film thickness of about 0.1 to 1.0 μm), and optionally subjected to a hydrophilic treatment to give a lithographic printing plate support. The support is further coated with a photosensitive material to form a photosensitive layer, and optionally subjected to a heating and burning treatment so that the photosensitive layer is stengthened, to give a photosensitive lithographic printing plate.

The lithographic printing plate is then successively subjected to preparation treatment such as image exposure, development, water washing and lacquering to give an original printing plate. The photosensitive layer remaining still undissolved after the development is water repellent, and forms image areas as an ink-accepting portion which selectively accepts ink alone. In the portion where the photosensitive layer is dissolved, the surface of the aluminum alloy support under the photosensitive layer is exposed, and the portion becomes a water-accepting portion due to its hydrophilic property and forms nonimage areas as an ink-excluding portion.

When printing is to be carried out, both end portions of the printing original plate are bent, and fixed to the printing drum of a printer. Accordingly, the substrate for a lithographic printing plate is required to have a desired strength from the standpoint of easy handling, durability, etc.

When dampening water is supplied to the surface of the printing original plate thus fixed, the water is retained in nonimage areas alone where the photosensitive layer is removed and a hydrophilic alloy substrate surface is exposed, and it is not held in image areas where a water repellent photosensitive layer surface remains. When ink is supplied to the original plate surface in such a state, the ink adheres to the image areas alone, and is held there. The ink adhering to and being retained in the image areas is further transferred to a bracket drum, and then it is transferred to a surface to be printed such as a paper sheet surface from the bracket drum, whereby printing is conducted.

When ink adheres to the nonimage areas, the printed materials are stained. Accordingly, in order to prevent ink from adhering to the nonimage areas which are exposed portions of the aluminum alloy support surface, it is important that the nonimage areas have water retainability to sufficiently retain dampening water. In order to ensure the water retainability, it is necessary to obtain an excellent uniformity of the grained surface and a defectless anodic oxide film by graining treatment such as electrochemical treatment.

Japanese Unexamined Patent Publication (Kokai) No. 62-148295 proposes a process for producing a lithographic printing plate excellent in resistance to ink staining in nonimage areas during printing, comprising the following procedures: an aluminum alloy slab is homogenization heat-treated at high temperature so that part of Fe forms solid solution, and cooled to precipitate the Si atoms contained in the slab as Al—Fe—Si-based intermetallic compounds and to fix them, thereby decreasing the amount of precipitated Si in the following steps; and the alloy is electrolytically grained to give a uniform grained surface. In addition, the patent publication shows in its example a process wherein intermediate annealing is omitted in the cold rolling step subsequent to hot rolling.

Furthermore, Japanese Unexamined Patent Publication (Kokai) No. 6-192779 proposes a process for producing a lithographic printing plate excellent in resistance to ink staining in nonimage areas during printing, in which precipitation of Si is inhibited in the production steps including casting, homogenization heat treating, hot rolling, cold rolling, intermediate annealing and final cold rolling by allowing the aluminum alloy to contain Mg.

Still furthermore, Japanese Unexamined Patent Publication (Kokai) No. 10-306355 proposes a process for producing a support, comprising starting hot-rolling a slab having been homogenization heat-treated, from given temperatures, finishing hot rolling at given temperatures, subsequently cooling slowly to given temperatures so that streaks are not formed as a fine recrystallized grain structure, and rolling the hot-rolled strip to a sheet having a final thickness at a reduction of at least 60% without subsequent heat treatment, thereby imparting a strength to the support.

The substrate must have a strength sufficient not to form defects such as recesses when it suffers a slight impact during transportation or handling. On the other hand, the support is also required to have a ductility sufficient to ensure bendability at the time when both ends of the original plate are bent and the original plate is fixed to the printing drum of a printing machine. Furthermore, in order to ensure durability to repeated stress during printing, the substrate must have a sufficient fatigue strength, namely, a combination of strength and a toughness. The substrate therefore must have mechanical properties which simultaneously meet these requirements. As a result, the strength of the substrate must be regulated so that it has a tensile strength of from about 145 to 180 MPa.

However, in the production process in which intermediate annealing is not conducted during cold rolling after hot rolling, work hardening caused by cold rolling makes the substrate have an excessively high strength, and imparting a suitable strength to the substrate becomes difficult. In order to lower the degree of work hardening, the following procedure can be conceived of: the final strip thickness is decreased in the hot rolling, and the working degree of the sheet in the following cold rolling is reduced. However, when the thickness of the strip which has become soft due to its high temperature is reduced by hot rolling, a slight strain of the rolling rolls causes nonuniformity in the thickness of the hot-rolled strip. The hot rolling as mentioned above therefore becomes significantly difficult in practice. Consequently, there is actually a lower limit to the thickness of the hot-rolled strip to be provided to cold rolling, and the thickness is about 3 mm even when the strip is made as thin as possible by hot rolling.

The present inventors have discovered the following method as a procedure to solve the problem of an excessive increase in the strength caused by work hardening. When cold rolling is conducted at a high reduction to generate a large amount of heat of working and make the temperature of the sheet being cold-rolled as high as at least the recovery temperature of the sheet, the sheet is softened by the recovery during or after cold rolling to have a strength in a desired range.

However, when such a substrate as produced by cold rolling while the sheet temperature is raised to at least the recovery temperature is used, there has arisen the problem that ink stains are generated in nonimage areas during printing, and resistance to ink staining lowers.

As a result of investigating the cause, the present inventors have made the following discovery. In a cold-rolled sheet having a temperature of at least the recovery temperature of the sheet due to a high reduction, Si in a solid solution tends to precipitate to form precipitated Si during cooling after cold rolling, which lowers resistance to ink staining in nonimage areas during printing.

SUMMARY OF THE INVENTION

An object of the present invention is to provide an aluminum alloy support for a lithographic printing plate produced by omitting intermediate annealing in the cold rolling step, and having electrolytic grainability due to its regulated chemical composition, resistance to ink staining in the nonimage areas due to its regulated content of precipitated Si, and an appropriate strength for easy handling.

Another object of the present invention is to provide a process for producing an aluminum alloy substrate for a lithographic printing plate the production of which is carried out while intermediate annealing is omitted in the cold rolling step to save energy and the number of rolling passes is decreased in cold rolling to simplify the sheet preparation step, give a desired strength, and inhibit precipitation of Si particles in the substrate so that the substrate shows extremely excellent resistance to ink staining in the nonimage areas.

In order to achieve the objects as mentioned above, the present inventors have intensively carried out investigations on improving the appropriate strength, electrolytic grainability and resistance to ink staining in the nonimage areas that the support produced, while intermediate annealing is omitted in the cold rolling step, is required to have. As a result, the present inventors have discovered that regulating the chemical composition of the Al alloy and controlling the production conditions so that its strength, the content of precipitated Si and the density of Si are regulated, can realize an improvement of the electrolytic grainability of the support and of the resistance to ink staining, and further maintain excellent easy handling, namely, excellent mechanical mountability of the support on the printing drum and excellent durability. The present invention has thus been achieved.

An aluminum alloy support for a lithographic printing plate of the present invention is prepared by homogenization heat-treating an aluminum alloy cast slab, hot rolling the slab to form a hot rolled strip, cold rolling the hot rolled strip without intermediate annealing to form a substrate, graining the substrate, and anodically oxidizing the substrate,

- said support comprising 0.10 to 0.40% of Fe, 0.03 to 0.15% of Si, 0.004 to 0.03% of Cu, and the balance of Al and unavoidable impurities, with up to 30 ppm of precipitated Si,
- an anodic oxide film from 0.1 to 1.0 $\mu$m thick being formed on the grained surface, said anodic oxide film containing up to 200/mm$^2$ of precipitated Si particles having an average particle size of at least 0.5 $\mu$m in terms of a radius of an equivalent circle, and
- said support having a tensile strength of from 145 to 180 MPa.

Furthermore, a process for producing an aluminum alloy substrate for a lithographic printing plate of the present invention comprises the steps of

- preparing an aluminum alloy cast slab containing 0.10 to 0.40 wt % of Fe, 0.03 to 0.15 wt % of Si and 0.004 to 0.03 wt % of Cu,
- homogenization heat-treating the slab,
- hot-rolling the slab to form a hot rolled strip, and
- cold rolling the hot rolled strip without intermediate annealing to form a cold rolled sheet,
- said cold rolling step comprising a final pass at least after which the sheet temperature becomes at least the recovery temperature of the sheet, and rapid cooling of the sheet subsequent to the final pass.

In order to impart electrolytic grainability to the substrate, the chemical composition of the substrate is regulated, and in order to impart resistance to ink staining in the nonimage areas of the substrate, the content and density of precipitated Si particles is restricted. In particular, in order to achieve the latter, the following procedures are conducted: part of Fe is allowed to form solid solution by homogenization heat treatment of the slab; Al—Fe-based, and Al—Fe—Si-based compounds are precipitated until the end of the following hot rolling; moreover, the hot-rolled strip is cold rolled while the sheet temperature is held at at least the recovery temperature of the sheet during cold rolling or after the final pass of cold rolling, whereby the work-hardened sheet is softened to give a substrate having a desired strength and a thickness; and the cold rolled sheet having a temperature of at least the recovery temperature is rapidly cooled to inhibit precipitation of Si particles. A support having an appropriate strength and extremely excellent resistance to ink staining in nonimage areas during printing as well as an aluminum alloy substrate for a lithographic printing plate can be produced by conducting the steps mentioned above.

When the aluminum alloy substrate further contains 0.002 to 0.02 wt % of Mg in a desirable mode of the present invention, the precipitation rate of Si lowers. As a result, the interval between the cold-rolling pass conducted at temperatures of at least the recovery temperature and the start of rapid cooling can be extended, and the rapid cooling operation becomes easy.

In a desirable mode of the present invention, it is preferred that at least the substrate temperature subsequent to the final pass and the rapid cooling following the final pass in the cold rolling step be regulated in such a manner that the substrate has a tensile strength of from 145 to 180 MPa and a precipitated Si content of up to 30 ppm.

In a desirable mode of the present invention, it is preferred that the substrate temperature of at least the recovery temperature be at least 100° C.

In a desirable mode of the present invention, it is preferred that rapid cooling of the substrate which is to be conducted subsequently to the final pass of cold rolling carried out at temperatures of at least the recovery temperature be conducted at a rate of at least 5° C./min.

A first feature of the present invention is that the substrate is cold rolled at such a high reduction that the substrate temperature at least subsequent to the final pass becomes at least the recovery temperature of the substrate. As a result, the substrate work hardened by cold rolling is softened during cold rolling or by the recovery after cold rolling, and an excessive increase in the strength is prevented. When softening the substrate by recovery is not conducted, the strength of the substrate becomes excessively high, and ductility necessary for bending both ends of the substrate for fixing it to the drum of a printing machine is not obtained.

Since the substrate can be recovered and softened by utilizing heat generation caused by such a high reduction, intermediate annealing can be omitted during cold rolling, which results in simplification of the preparation step and energy savings. It is preferred that the substrate temperature of at least the recovery temperature be at least 100° C. The upper limit temperature is defined to be 225° C. ordinary cold rolling apparatuses are thought not to exceed the temperature. However, when the substrate temperature exceeds 225° C., Si tends to be easily precipitated, and regulation of its content to up to 30 ppm becomes difficult.

Although the substrate temperature is estimated to be increased by heat of working during cold rolling pass, it cannot be measured practically during the rolling pass. Accordingly, the substrate temperature subsequent to the rolling pass which can be measured is defined.

A second feature of the present invention is to cool rapidly a substrate having at least the recovery temperature subsequently to cold rolling pass. The rapid cooling inhibits precipitation of Si particles from Si in solid solution. When the substrate is not rapidly cooled, a large amount of Si is precipitated during cooling, and a uniform grained surface cannot be obtained by electrolytic graining and anodic oxidation. As a result, the substrated reduces its water retainability, accepts ink, and lowers resistance to ink staining. A preferred rapid cooling rate is 5° C./min.

DESCRIPTION OF THE PREFERRED EMBODIMENT

First, reasons for restricting the chemical composition of the aluminum alloy in the present invention will be explained.

Fe: 0.10 to 0.40 wt %

Fe together with Si is an element necessary for ensuring the strength by forming Al—Fe—Si-based fine compounds and refining the grains of the cast structure. When the Fe content is less than 0.10 wt %, the effect of refining the grains of the cast structure cannot be obtained, and the presence of coarse grains reduces the uniformity in appearance of the electrolytically grained surface. On the other hand, when the Fe content exceeds 0.40 wt %, coarse Fe—Al-based and Al—Fe—Si-based compounds are formed. As a result, the substrate has significant local nonuniformity in the chemical properties, and the pit shapes on the electrochemically grained surface become nonuniform, resulting in deteriorating the water retainability.

In addition, Fe is usually an element contained in an aluminum alloy as an impurity, and the production cost of the substrate rises when the Fe content is defined to be less than 0.10 wt % because an aluminum base metal having high purity is required as the raw material.

Si: 0.03 to 0.15 wt %

Si together with Fe is an element necessary for ensuring the strength by forming fine Al—Fe—Si-based compounds, when the Si content is less than 0.03 wt %, the effect becomes insufficient. On the other hand, when the Si content exceeds 0.15 wt %, coarse Al—Fe—Si-based compounds are formed, and the local nonuniformity of the chemical properties of the substrate becomes significant. As a result, the pit shapes of the electrochemically grained surface become nonuniform, and the water retainability is deteriorated. Moreover, precipitated Si particles are formed to unpreferably promote ink staining of the nonimage areas.

In addition, Si is an element usually contained in an aluminum alloy as an impurity, and the production cost of the substrate rises when the Si content is defined to be less than 0.03 wt % because an aluminum base metal having high purity is required as the raw material.

Cu: 0.004 to 0.03 wt %

Cu is an element which greatly influences electrochemical graining. When the Cu content is at least 0.004 wt %, the pit density on the electrochemically grained surface can preferably be made appropriate. On the other hand, when the Cu content exceeds 0.03 wt %, the pit density on the electrochemically grained surface lowers. As a result, the pit size becomes excessively large or unetched regions (ungrained portions) remain. Consequently, the water retainability of the nonimage areas is reduced, and ink staining increases during printing.

The substrate sometimes contains as impurities elements such as Mn, Cr, Zr, V, Zn, Ni, Ga, Li and Be. When the contents of such elements are each a trace of up to about 0.05 wt %, the elements do not exert markedly adverse effect on the present invention. Moreover, Ti and B are effective for grain refining of the cast structure; therefore, they are useful for preventing crack formation during casting, and effective for preventing formation of streaks on the grained surface caused by grain coarsening of the cast structure. B is added together with Ti, and is effective for grain refining of the cast structure. The effect of adding B in combination with Ti is significant compared with that of adding Ti alone. When both Ti and B are added, the following contents are preferred: Ti: 0.01 to 0.05 wt %; B: 0.0001 to 0.02 wt %.

Mg: 0.002 to 0.02 wt %

Mg can delay precipitation of Si particles, and extend the interval between the end of the cold-rolling pass conducted at temperatures of at least the recovery temperature and the start of rapid cooling. Mg therefore facilitates the rapid cooling operation. A Mg content of at least 0.002 wt % can sufficiently extend the interval therebetween. On the other hand, a Mg content exceeding 0.02 wt % makes recovery of the cold-rolled sheet difficult; consequently, the substrate comes to have an excessively high strength, and there is the possibility that imparting a desired strength thereto becomes difficult.

Precipitated Si: up to 30 ppm, precipitated Si particles having a particle size of up to 0.5 pm: up to 200/$mm^2$ Precipitation of Si particles from Si in solid solution tends to take place intensively in portions where the dislocation density is high. There is always a chance of precipitation in the course of producing a substrate in which dislocation generation is repeated by rolling. When the content of precipitated Si exceeds 30 ppm, precipitation and gathering of Si particles is undesirably facilitated to form a large number of coarse particles. Moreover, precipitated Si is difficult to anodically oxidize and is also difficult to pass a current during anodic oxidation treatment, and formation of an anodic oxide film having a uniform thickness becomes difficult; a thin film portion of the film tends to be corroded with dampening water, etc. repeatedly applied thereto during printing, and causes ink staining. Since the anodic oxide film on the support surface prepared by treating the substrate usually has a thickness of 0.1 to 1.0 μm, the film thickness tends to fluctuate extremely when the particle size of precipitated Si increases. When the number of the precipitated Si particles having an average particle size of at least 0.5 μm exceeds 200/mm$^2$ on the support surface having been anodically oxidized, defects of ink stains are manifested. The number of precipitated Si particles is therefore up to 100/mm$^2$. The average particle size of precipitated Si particles herein represents an area in terms of radius of the corresponding circle.

Next, a typical embodiment of the process for producing an aluminum alloy substrate for a lithographic printing plate according to the present invention will be explained.

A melt of an aluminumalloy prepared by procedures such as slag-off treatment and having a composition as mentioned above is conventionally cast to give a slab. Although there is no specific limitation on the casting method, the semi-continuous casting method is preferred. Although there is no specific limitation on the thickness of the slab, the thickness is usually from about 500 to 600 mm.

The slab is generally scalped prior to the next step of homogenization heat treatment. However, when an oxidized layer on the slab surface formed by the homogenization heat treatment must be removed, the slab is scalped thereafter.

The slab is subjected to homogenization heat treatment. The homogenization heat treatment in combination with the following hot rolling makes impurities as well as part of Fe form a solid solution, and uniformly disperse a part of Fe as intermetallic compounds in fine particles. The homogenization heat treatment temperature is typically at least 500° C. in order to ensure the solid solution of Fe, etc., and it is typically up to 620° C. in order to prevent partial melting of the slab. The holding time of the homogenization heat treatment is preferably at least 30 minutes. The slab may be scalped after the homogenization heat treatment for the purpose of preventing surface oxidation, and the like. When the homogenization heat treatment temperature exceeds the temperature range as mentioned above, the aforementioned compounds tend to precipitate coarsely. Graining treatment such as electrochemical treatment and anodic oxidation subsequent thereto cause fluctuation of the size of pits which correspond to the sites where the compounds seem to have precipitated. As a result, the water retainability is decreased, and there is the possibility that ink adheres to the nonimage areas to stain printed materials.

After homogenization heat treatment, the slab is hot-rolled. There is no specific limitation on the conditions of hot rolling.

After hot rolling, the hot-rolled product is cold-rolled. Intermediate annealing is omitted during cold rolling to simplify the sheet production step. In order to solve the problem of hardening caused by rolling of the cold-rolled sheet the intermediate annealing of which has been omitted, the sheet is cold-rolled so that the sheet temperature subsequent to at least the final pass becomes at least the recovery temperature of the sheet. Although the recovery temperature of the sheet differs depending on the composition and accumulated strain amount of the sheet, the sheet having a composition of the present invention starts to recover at temperatures of about 100° C. when the sheet has a reduction of 50%. When the draft is higher, the recovery starts at lower temperature. In order to make the sheet temperature at least its recovery temperature, procedures such as mentioned below can be considered: (1) the coil to be cold-rolled is heated so that the initial temperature becomes at least the recovery temperature, and cold rolling is started; and (2) when the initial temperature of the coil to be cold-rolled is close to room temperature, a large cold rolling reduction is set so that heat of working is generated in the sheet. The procedure in (1) cannot produce a marked energy saving effect. The procedure in (2) saves energy, and has the effect of decreasing the number of rolling. The reduction is preferably at least 50%.

The most preferable procedure for ensuring the sheet temperature of at least the recovery temperature after the final pass is to plastically deform the sheet and make the sheet hot with the heat of working generated by the deformation, as mentioned in (2). The plastic deformation and rapid heating with heat of working generated by the plastic deformation can inhibit precipitation of Si particles which takes place in the process of a rise in temperature when the substrate is heated from outside.

For example, when a strip 6 mm thick at 40° C. (room temperature) in a rolling mill is cold rolled at a rolling speed of from 500 to 2,000 m/min to form a sheet 3 mm thick (reduction of 50%), the sheet temperature rises to about 100° C. When the sheet at 100° C. is continuously rolled to a sheet 1 mm thick (reduction of 67%), the sheet temperature rises to about 150° C. The worked structure of the sheet is recovered and the sheet is softened while the sheet has a temperature of at least the recovery temperature. When the sheet 1 mm thick heated to about 150° C. is rolled to have a thickness of 0.5 mm (reduction of 50%), the sheet temperature rises to about 170° C. Even when the sheet 0.5 mm thick is further rolled at a reduction of at least 50%, an amount of thermal radiation from the sheet per unit time becomes large. For example, the sheet is rolled to have a thickness of 0.25 mm (reduction of 50%), the sheet temperature lowers to about 130° C. after the pass.

The coil wound at the temperature has a large residual strain amount, though it recovers, and Si in solid solution is likely to precipitate as Si particles in the course of cooling the coil. The sheet is therefore subjected to rapid cooling which is another important requirement of the present invention immediately after or within 10 minutes after the final pass of cold rolling to lower the temperature to 80° C. or less. A cooling rate of at least 5° C./min becomes the target of the rapid cooling. Preferred procedures rapid cooling include: a procedure of immediately passing a sheet having been discharged from the rolling roll of the final pass through a cooling room; a procedure of immersing a wound coil in a cooling medium; and a procedure of coating a coil with a cooling medium. That is, a cooling medium is preferably used. As explained above, a sheet subsequent to the final pass of cold rolling is rapidly cooled preferably within 10 minutes, more preferably immediately after the final pass to inhibit precipitation of Si particles from Si in solid solution. A particularly preferable aluminum alloy substrate for a lithographic printing plate can be obtained by restricting the strength of the cold rolled sheet to 145 to 180 MPa and the total amount of precipitated Si to 30 ppm or less.

In addition, typical examples as mentioned above are ones in which a coil is continuously cold-rolled with four cold rolling passes without cooling the coil among the passes.

When the coil must be cooled among the passes due to an operational requirement, the sheet temperature is lowered to 80° C. or less by rapid cooling after the cold-rolling pass, preferably within 10 minutes, more preferably immediately after the pass, similarly to the above explanation. When the time interval between the end of the pass and the start of the rapid cooling exceeds 10 minutes, Si particles tend to be precipitated, and the total amount tends to become excessive even when the sheet contains a suitable amount of Mg in accordance with a desirable mode of the present invention. When the coil is cooled among passes of cold rolling and the subsequent cold rolling is restarted, the following procedure is preferred because heating the coil from outside is not preferred, though the procedure depends on the sheet thickness. The coil is not excessively cooled, and cooled to about 80° C. so that sheet easily attains a temperature of at least the recovery temperature with the heat of working generated in the following passes.

When the aluminum alloy substrate for a lithographic printing plate is electrically grained, the substrate surface is, if necessary, chemically etched with acid or alkali to degrease or remove the oxide film as a pretreatment. The electrolytic graining itself is a treatment in which pits are produced on the surface to form a grained surface by applying an alternating current while graphite is used as a counter electrode to effect electrolytic etching.

Graining the substrate imparts adhesion of the photosensitive film and water retainability associated with printing performance to the substrate. The pits must be uniformly formed over the entire printing plate because uniform adhesion and water retainability must be obtained thereover.

Next, a detailed explanation will be given to the surface treatment method of the substrate for a lithographic printing plate according to the present invention in which the surface of the substrate obtained as described above is grained by forming pits.

The graining method in the present invention is an electrolytic graining method wherein the substrate is grained by applying an alternating current in an electrolytic solution of hydrochloric acid or nitric acid series. In the present invention, the electrolytic graining method can be used in combination with a mechanical graining method such as a wire brush graining method in which the aluminum surface is scratched with metal wires, a ball graining method in which the aluminum surface is grained with abrasive balls and abrasives and a brush graining method in which the aluminum surface is grained with a nylon brush and abrasives.

Prior to electrolytic graining, the substrate is surface treated for the purpose of cleaning the surface by removing rolling oil adhering to the aluminum-surface or gripped abrasives (when the substrate is mechanically grained) after mechanical graining.

Rolling oils are generally removed by surface cleaning using trichlorethylene or other solvents or surfactants. Rolling oils and abrasives are also generally removed by using a method for neutralization after alkaline etching and removal of smut, in which an aluminum alloy sheet is immersed in an aqueous solution of sodium hydroxide, potassium hydroxide, sodium carbonate, sodium silicate, etc., at 20–80° C. for 5–250 sec, and is then immersed in a 10–30% aqueous solution of nitric acid or sulfuric acid at 20–70° C. for 5–250 sec.

The thus surface-cleaned aluminum alloy sheet is then treated by electrolytic graining.

The present invention uses an electrolytic solution such as a chloric acid solution which preferably has a concentration of 0.01–3 wt %, more preferably of 0.05–2.5 wt %, or a nitric acid solution which preferably has a concentration of 0.2–5 wt %, more preferably of 0.5–3 wt %.

The electrolytic solution may contains a corrosion inhibitor or stabilizing agent such as nitrates, chlorides, monoamines, diamines, aldehydes, and/or a pit-uniforming agent. Moreover, the electrolytic solution may contain a suitable amount of aluminum ions (1 to 10 g/l).

The substrate is usually treated with the electrolytic solution usually at temperatures of 10 to 60° C. Any of the rectangular waves, trapezoidal waves and sinusoidal waves can be used in the alternating current in the treatment so long as the positive polarity and the negative one are alternately exchanged. Commercially available single-phase or three-phase alternating current can be employed. Moreover, the electrolytic graining is carried out preferably at a current density of from 5 to 100 A/dm$^2$ for 10 to 300 sec.

The surface roughness of the aluminum alloy support in the present invention is regulated to be from 0.2 to 0.8 $\mu$m by the amount of electricity. When the surface roughness exceeds 0.8 $\mu$m, the grained surface is heavily covered with macropits, which unpreferably cause stains during printing. Moreover, when the surface roughness is less than 0.2 $\mu$m. dampening water on the printing plate cannot be controlled, and dot portions in shadow portions tend to be filled in, whereby good printed materials cannot be obtained.

Smut adhering to the surface of the aluminum alloy substrate thus grained is removed with 10 to 50% hot sulfuric acid (40 to 60° C.) or diluted alkali (sodium hydroxide, etc.). When the smut is removed with alkali, the substrate is continuously immersed in acid (nitric acid or sulfuric acid) to be cleaned and neutralized.

When the surface smut is removed, an anodic oxide film is formed. Although known methods can be employed for the anodic oxidation, sulfuric acid has been used as the most useful electrolytic solution. Phosphoric acid is also a useful electrolytic solution. Furthermore, an acid mixture of sulfuric acid and phosphoric acid disclosed in Japanese Unexamined Patent Publication (Kokai) No. 55-28400 is also useful.

The sulfuric acid method is usually conducted with a direct current; however, alternating current can also be used. Sulfuric acid having a concentration of 5 to 30% is used, and electrolysis is conducted at temperatures of from 20 to 60° C. for 5 to 250 sec to form an oxide film having a thickness of from 0.1 to 1.0 $\mu$m on the surface. The electrolytic solution preferably contains aluminum ions, and the electrolytic current density is preferably from 1 to 20 A/dm$^2$. The phosphoric acid method is conducted in the following manner: phosphoric acid having a concentration of from 5 to 50% is used; and electrolysis is conducted at temperatures of from 30 to 60° C. for;10 to 300 sec at a current density of from 1 to 15 A/dm$^2$. Precipitated Si particles having an average particle size of at least 0.5 $\mu$m in the surface oxide film of the support thus treated amounts to 200/mm$^2$ or less.

When the substrate is provided with an anodic oxide film as explained above, it is optionally subjected to after treatment. For example, the substrate is immersed in an aqueous solution of polyvinylphosphonic acid by the method disclosed in British Patent No. 1,230,447, or it is immersed in an aqueous solution of an alkali metal silicate by the method disclosed in U.S. Pat. No. 3,181,461. It may also be provided with a primer coating of a hydrophilic polymer, which is selected in accordance with the properties of a photosensitive material to be provided later.

EXAMPLES

Molten aluminum alloys having various chemical compositions as shown in Table 1 were prepared. Each of the molten aluminum alloys was semicontinuous-cast to give a cast slab having a thickness of 560 mm. Each of the two major surfaces of the slab was scalped to reduce the thickness by 10 mm, and the slab had a thickness of 540 mm.

The slab was then homogenization heat-treated at 600° C. for 4 hours, and hot-rolled to give a hot-rolled strip having a thickness of 6 mm. The initial temperature (starting temperature) of hot rolling was from 450 to 350° C., and the final temperature (finishing temperature) was from 400 to 300° C.

The hot-rolled strip at room temperature (40° C.) was then cold-rolled. The cold rolling speed was from 500 to 2,000 m/min. As the sheet thickness decreased, the rolling speed was increased. Cold rolling was conducted in such a system that the cold-rolled sheet was wound after each pass to form a coil, and the coil was provided to the following pass.

As examples of the present invention, hot rolled strips were cold-rolled according to the following 4 pass pass-schedule: 6 mm→3 mm→1 mm→0.5 mm→0.25 mm. The cold-rolled sheets were always rapidly cooled after the final pass (fourth pass). In one example, the sheet was rapidly cooled also in the intermediate pass (second pass).

In comparative examples, the pass schedule was the same as mentioned above, provided that the sheets were slowly cooled after the final pass (fourth pass).

In other comparative examples, the hot-rolled strips were cold-rolled by the conventional technology according to the following 6 pass pass-schedule: 6 mm→3.5 mm→2.0 mm→1.2 mm→0.7 mm→0.4 mm→0.25 mm.

Table 2 shows temperatures and cooling rates in each of the cold rolling steps.

The cold-rolled sheets were subsequently subjected to removal of rolled oil adhering to the surface with 10% sodium hydroxide, neutralization-cleaned with 20% nitric acid at 20° C., and electrolytically grained in 1% hydrochloric acid or 1% nitric acid electrolytic solution at 50° C. for 10 sec with an alternating current at a current density of 30 A/dm$^2$.

The sheets were continuously surface-cleaned by immersing them in a 15% aqueous sulfuric acid solution at 50° C. for 10 sec, and provided with an oxide film 0.5 μm thick in an electrolytic solution containing mainly 20% sulfuric acid at a bath temperature of 30° C.

In Table 2, Samples D, G, I, L and N belong to examples of the present invention; Samples B, C, E, F, H, J, K, M, O and S belong to comparative examples in which the samples were prepared by cooling slowly, and of the samples, Sample S had a chemical composition outside the scope of the present invention; Samples A, P, Q, R, S and T belong to comparative examples, and had chemical compositions outside the scope of the present invention.

Samples A, B, D, E, I and J were prepared by 4 pass rolling; the coils were not cooled in the midway cold rolling passes, and subjected to the following cold rolling pass.

Samples G, H, L, M, N, O, P, Q, R, S and T were prepared by 4 pass cold rolling. The coils wound subsequently to the second cold rolling pass were cooled and then subjected to the third cold rolling pass.

Samples C, F and K were prepared by 6 pass cold rolling. The coils were cooled between the second and the third cold rolling pass and between the fourth and the fifth cold rolling pass.

The coils were cooled by the following procedures.

The rapid cooling according to the present invention was conducted by immersing the coils in an oil cooling medium, whereby the coils were cooled at a rate of 10° C./min.

The slow cooling in the comparative examples was conducted by forcibly air-cooling the coils with fans, whereby the coils were cooled at a rate of 0.2° C./min.

The alloy substrates 0.25 mm thick thus obtained were treated with 10% sodium hydroxide so that rolling oil adhering to the surface was removed, neutralized in 20% nitric acid at 20° C., and electrolytically grained in a 1% hydrochloric acid or 1% nitric acid electrolytic solution at 50° C. by applying an alternating current at a current density of 30 A/dm$^2$ for 10 sec.

The substrates were continuously surface-cleaned by immersing them in a 15% aqueous sulfuric acid solution at 50° C. for 3 minutes, and provided with an oxide film 0.5 μm thick in an electrolytic solution at 30° C. containing 20% sulfuric acid as a major component.

The samples thus prepared were coated with the following photosensitive layer (amount of dried coating of 2.5 g/m$^2$):

ester compound of naphthoquinone (1,2)-diazido-(2)-5-sulfonyl chloride with a resorcin-benzaldehyde resin
1 part by weight;

copolymerization condensation resin of phenol, a mixture of m-, p-cresol and formaldehyde
3.5 parts by weight;

2-trichloromethyl-5-[β-(2'-benzofuryl)vinyl]1,3,4-oxadiazole
0.03 part by weight;

Victoria Pure Blue BOH (manufactured by Hodogaya Chemical Co., Ltd.)
0.1 part by weight;

o-naphthoquinonediazidosulfonic acid ester with p-butylphenol benzaldehyde novolac resin
0.05 part by weight; and methyl cellosolve
27 parts by weight A sample having the photosensitive layer was exposed for 50 sec to a metal halide lamp (3 kW) placed at a distance of 1 m, and developed with a 4% aqueous sodium metasilicate solution at 25° C. for 45 sec to give a lithographic printing plate.

Measurements of a tensile strength, electrolytic grainability, the content of precipitated Si, the number of precipitated Si particles having an average particle size of at least 0.5 μm and resistance to ink staining were made on Samples A to T thus prepared. The measurement procedures are as described below.

[Tensile Strength]

A tensile test specimen (JIS No. 13 B) was prepared from a sheet having been cold-rolled, and the tensile strength σB was measured.

[Electrolytic Graining]

The surface state of a sheet having been elctrolytically grained was observed with a scanning electron microscope, and the uniformity of the pits was evaluated.

The evaluation criteria were as follows: ○: pits being uniform; and ×: pit shapes being deformed or unetched portions being present.

[Content of Precipitated Si]

A sheet provided with an oxide film was dissolved in a solution of HCl and $H_2O_2$ having a $HCl/H_2O_2$ ratio of 1:1. The residue obtained by filtering the resultant mixture was decomposed with an alkaline solution. The resultant solution was neutralized, and ammonium molybdate was added to the solution to form silicomolybdic yellow. When the concentration of the solution was low, the solution was reduced with a sulfonic acid reducing solution to form molybdenum blue. The absorbance of the solution was measured, and converted to the content of precipitated Si.

[Number of Precipitated Si Particles Having an Average Particle Size of at Least 0.5 μm ]

A surface layer 0.5 μm thick of a sheet having an anodic oxide film was etched and dissolved with a 1% aqueous sodium hydroxide solution, and mapping analysis of Fe and Si was performed with an X-ray microanalyzer. Only those Si particles which were not in combination with Fe were measured by an image analyzer (trade name of LUZEX F, manufactured by Nireco Corporation), and the radius of the area of each of the particles in terms of circle was defined to be the average particle size. Only those particles which had an average particle size of at least 0.5 μm were counted.

[Resistance to Ink Staining]

The printing plates thus prepared above were mounted on an offset printing machine KOR, and 100,000 paper sheets were printed. The presence of ink staining in the nonimage areas was sensory tested. As a result, those paper sheets on which no ink stains were observed were evaluated as "good (○)", and those paper sheets on which ink stains were observed were evaluated as "failed (×)." Table 2 shows the observation results.

From the results of testing Samples D and I in the examples of Table 2, the following can be seen: the tensile strength was in a suitable range and the sheets showed good grainability because the sheet temperature subsequent to the final fourth pass was set at 120° C. which was at least the recovery temperature of the sheets and the sheets were subsequently rapidly cooled at a cooling rate of 10° C./min; and the sheets showed excellent resistance to ink staining because the content of precipitated Si was low and the number of precipitated Si particles having an average particle size of at least 0.5 μm was small.

From the test results of Samples G, L and N in the examples of Table 2, the following can be seen similarly to the above samples: the tensile strength was in a suitable range and the sheets showed good grainability because the sheet temperature subsequent to the second pass was set at 150° C. which was at least the recovery temperature of the sheets and the sheets were subsequently rapidly cooled at a cooling rate of 10° C./min, and because the sheet temperature subsequent to the final fourth pass was set at 120° C. which was at least the recovery temperature of the sheets and the sheets were subsequently rapidly cooled at a rate of 10° C./min; and the sheets showed excellent resistance to ink staining because the content of precipitated Si was low and the number of precipitated Si particles having an average particle size of at least 0.5 μm was small.

In contrast, the pass schedule of Samples B, E, H, J, M and O was 4 passes similarly to examples of the present invention, and the sheet temperatures subsequent to the final fourth pass was set at 130° C. or 120° C. which was at least the recovery temperature of the sheets. However, the sheets were subsequently cooled slowly at a rate of 0.2° C./min. As a result, the samples had a large content of precipitated Si, and contained a large number of precipitated Si particles having an average particle size of at least 0.5 μm. The samples therefore were found to have poor resistance to ink staining.

Furthermore, the following are understood. Since Samples C, F and K in comparative examples were prepared by cold-rolling sheets without making the sheets have at least the recovery temperature, the samples had a tensile strength exceeding a suitable range, and cracks tended to be formed during printing.

It is understood that Samples A, B and C in comparative examples had a Cu content outside the scope of the invention and showed poor electrolytic grainability.

The following are understood: Sample P in a comparative example had an Fe content outside the scope of the invention and showed poor electrolytic grainability; Sample Q in comparative examples had a large Si content outside the scope of the invention, showed somewhat poor electrolytic grainability, had a large content of precipitated Si, and contained a large number of precipitated Si particles having an average particle size of at least 0.5 μm. resulting in showing poor resistance to ink staining; Samples R and S in comparative examples had a Mg content outside the scope of the invention, were difficult to recover, and had an excessively high tensile strength; and Sample T in comparative examples had a Cu content outside the scope of the invention, and showed poor electrolytic grainability and poor resistance to ink staining.

As explained above, according to the present invention, an aluminum alloy substrate and a support for a lithographic printing plate excellent in ink staining can be produced while energy savings and high productivity are realized by making the sheet temperature at least subsequent to the final cold rolling pass at least the recovery temperature of the sheet even when intermediate annealing is omitted during cold rolling, thereby preventing an excessive rise in the strength caused by work hardening and imparting strength in a desirable range to the substrate, and by rapidly cooling the sheet from the recovery temperature, thereby inhibiting precipitation of Si particles, and imparting a uniforming pit size and good water retainability during electrolytic graining.

TABLE 1

| Alloy No. | Chemical Composition Fe | Si | Cu | Mn | Mg | Zn | Ti | B | Classification |
|---|---|---|---|---|---|---|---|---|---|
| 1 | 0.32 | 0.08 | <u>0.001</u> | 0.001 | 0.001 | 0.005 | 0.02 | 0.0005 | Comp. alloy |
| 2 | 0.32 | 0.08 | 0.013 | 0.001 | 0.001 | 0.005 | 0.03 | 0.0005 | Alloy of invention |
| 3 | 0.20 | 0.06 | 0.013 | 0.001 | 0.002 | 0.003 | 0.02 | 0.0005 | Alloy of invention |
| 4 | 0.20 | 0.06 | 0.013 | 0.001 | 0.008 | 0.005 | 0.02 | 0.0005 | Alloy of invention |
| 5 | 0.20 | 0.06 | 0.012 | 0.001 | 0.015 | 0.003 | 0.02 | 0.0005 | Alloy of invention |
| 6 | <u>0.80</u> | 0.10 | 0.020 | 0.001 | 0.015 | 0.003 | 0.03 | 0.0004 | Comp. alloy |
| 7 | 0.32 | <u>0.20</u> | 0.020 | 0.001 | 0.010 | 0.003 | 0.03 | 0.0005 | Comp. alloy |
| 8 | 0.20 | 0.08 | 0.013 | 0.001 | <u>0.050</u> | 0.003 | 0.03 | 0.0005 | Comp. alloy |
| 9 | 0.20 | 0.08 | <u>0.050</u> | 0.001 | 0.005 | 0.002 | 0.02 | 0.0004 | Comp. alloy |

Note: Underlined values are outside the scope of the present invention.

TABLE 2

Production Conditions and Evaluation Results

| | | 1 Pass | | 2 Pass | | 3 Pass | | 4 Pass | |
|---|---|---|---|---|---|---|---|---|---|
| Sample mark | Alloy No. | Starting temp. (° C.) | Finishing temp. (° C.) | Finishing temp. (° C.) | Cooling rate (° C./min) | Starting temp. (° C.) | Finishing temp. (° C.) | Finishing temp. (° C.) | Cooling rate (° C./min) |
| A | 1 | 40 | 90 | 150 | — | 150 | 170 | 130 | 10 |
| B | 1 | 40 | 90 | 150 | — | 150 | 170 | 130 | 0.2 |
| C | 1 | 40 | 80 | 90 | 0.2 | 40 | 80 | 90 | 0.2 |
| D | 2 | 40 | 90 | 150 | — | 150 | 170 | 130 | 10 |
| E | 2 | 40 | 90 | 150 | — | 150 | 170 | 130 | 0.2 |
| F | 2 | 40 | 90 | 90 | 0.2 | 40 | 80 | 90 | 0.2 |
| G | 3 | 40 | 90 | 150 | 10 | 80 | 140 | 120 | 10 |
| H | 3 | 40 | 90 | 150 | 0.2 | 80 | 140 | 120 | 0.2 |
| I | 4 | 40 | 90 | 150 | — | 150 | 170 | 130 | 10 |
| J | 4 | 40 | 90 | 150 | — | 150 | 170 | 130 | 0.2 |
| K | 4 | 40 | 90 | 90 | 0.2 | 40 | 80 | 90 | 0.2 |
| L | 4 | 40 | 90 | 150 | 10 | 80 | 140 | 120 | 10 |
| M | 4 | 40 | 90 | 150 | 0.2 | 80 | 140 | 120 | 0.2 |
| N | 5 | 40 | 90 | 150 | 10 | 80 | 140 | 120 | 10 |
| O | 5 | 40 | 90 | 150 | 0.2 | 80 | 140 | 120 | 0.2 |
| P | 6 | 40 | 90 | 150 | 10 | 90 | 140 | 120 | 10 |
| Q | 7 | 40 | 90 | 150 | 10 | 90 | 140 | 120 | 10 |
| R | 8 | 40 | 90 | 150 | 10 | 90 | 140 | 120 | 10 |
| S | 8 | 40 | 90 | 150 | 0.2 | 100 | 140 | 120 | 0.2 |
| T | 9 | 40 | 90 | 150 | 10 | 90 | 140 | 120 | 10 |

| | | 5 Pass | 6 Pass | | | | | No. | | |
|---|---|---|---|---|---|---|---|---|---|---|
| Sample mark | Alloy No. | Finishing temp. (° C.) | Finishing temp. (° C.) | Cooling rate (° C./min) | TS* (MPa) | EG# | Content of Si## (ppm) | of Si## ≧0.5 μm ($mm^2$) | Resistance to IS** | Classification |
| A | 1 | — | — | — | 160 | x | 28 | 80 | ○ | Comp. Ex. |
| B | 1 | — | — | — | 155 | x | 210 | 1200 | x | Comp. Ex. |
| C | 1 | 80 | 90 | 0.2 | 190 | x | 25 | 80 | ○ | Comp. Ex. |
| D | 2 | — | — | — | 162 | ○ | 28 | 100 | ○ | Ex. |
| E | 2 | — | — | — | 157 | ○ | 210 | 1200 | x | Comp. Ex. |
| F | 2 | 80 | 90 | 0.2 | 192 | ○ | 25 | 110 | ○ | Comp. Ex. |
| G | 3 | — | — | — | 160 | ○ | 28 | 100 | ○ | Ex. |
| H | 3 | — | — | — | 158 | ○ | 180 | 1000 | x | Comp. Ex. |
| I | 4 | — | — | — | 170 | ○ | 20 | 40 | ○ | Ex. |
| J | 4 | — | — | — | 165 | ○ | 80 | 510 | x | Comp. Ex. |
| K | 4 | 80 | 90 | 0.2 | 200 | ○ | 20 | 40 | ○ | Comp. Ex. |
| L | 4 | — | — | — | 175 | ○ | 15 | 50 | ○ | Ex. |
| M | 4 | — | — | — | 170 | ○ | 90 | 350 | x | Comp. Ex. |
| N | 5 | — | — | — | 176 | ○ | 5 | 5 | ○ | Ex. |
| O | 5 | — | — | — | 172 | ○ | 50 | 250 | x | Comp. Ex. |
| P | 6 | — | — | — | 250 | x | 25 | 120 | ○ | Comp. Ex. |
| Q | 7 | — | — | — | 190 | Δ | 250 | 2000 | x | Comp. Ex. |
| R | 8 | — | — | — | 220 | ○ | 2 | 0 | ○ | Comp. Ex. |
| S | 8 | — | — | — | 200 | ○ | 25 | 5 | ○ | Comp. Ex. |
| T | 9 | — | — | — | 180 | x | 30 | 120 | x | Comp. Ex. |

Note: Underlined evaluation values designate that the values are outside the scope of the present invention.
*TS = Tensile strength,
EG# = Electrolytic grainability,
Si## = precipitated Si,
IS** = ink staining

What is claimed is:

1. An aluminum alloy support containing precipitated Si for a lithographic printing plate prepared by homogenization heat-treating an aluminum alloy cast slab, hot rolling the slab to form a hot rolled strip, cold rolling the hot roiled skip without intermediate annealing to form a substrate, graining the substrate, and anodically oxidizing the substrate, said substrate comprising 0.10 to 0.40% of Fe, 0.03 to 0.15% of Si, 0.004 to 0.03% of Cu, and the balance of Al and unavoidable impurities including precipitated Si in an amount no more than 30 ppm, an anodic oxide film from 0.1 to 1.0 μm thick being formed on the grained surface, said anodic oxide film containing precipitated Si particles in an amount no more than $200/mm^2$ and having an average particle size of at least 0.5 μm, and said support having a tensile strength of from 145 to 180 MPa wherein the substrate is resistant to ink staining in the non-image areas.

2. An aluminum alloy support for a lithographic printing plate according to claim 1, wherein said support further comprises 0.002 to 0.02% of Mg.

* * * * *